(12) United States Patent
Dillen et al.

(10) Patent No.: US 6,265,736 B1
(45) Date of Patent: Jul. 24, 2001

(54) IMAGE PICK-UP APPARATUS

(75) Inventors: Bartholomeus G. M. H. Dillen; Antonius J. C. Bruijns, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 1160 days.

(21) Appl. No.: 08/715,256

(22) Filed: Sep. 16, 1996

Related U.S. Application Data

(63) Continuation of application No. 08/345,025, filed on Nov. 23, 1994, now abandoned.

(30) Foreign Application Priority Data

Nov. 26, 1993 (BE) .................................................. 09301310

(51) Int. Cl.$^7$ ........................ H01L 27/148; H01L 29/768
(52) U.S. Cl. ........................ 257/232; 257/233; 348/303; 348/304; 348/319
(58) Field of Search ................................... 257/231, 232, 257/233; 348/302, 303, 304, 319

(56) References Cited

U.S. PATENT DOCUMENTS

| | | | |
|---|---|---|---|
| 4,707,743 | 11/1987 | Tokummitsu et al. | 358/213.13 |
| 4,758,741 | 7/1988 | Arques | 307/311 |
| 4,926,225 | 5/1990 | Hosack | 357/24 |
| 4,928,158 | * 5/1990 | Kimata | 357/24 |
| 4,972,254 | * 11/1990 | Endo et al. | 358/44 |
| 5,105,450 | * 4/1992 | Yamada | 377/58 |
| 5,144,449 | * 9/1992 | Ishida et al. | 358/213.26 |
| 5,153,731 | * 10/1992 | Nagasaki et al. | 358/213.11 |
| 5,177,614 | * 1/1993 | Kawaoka et al. | 358/213.22 |
| 5,426,317 | * 6/1995 | Hiroth | 257/230 |

OTHER PUBLICATIONS

Charge–coupled Devices and Systems, M.J. Howes et al. Eds., John Wiley and Sons, 1980, p. 253.

(List continued on next page.)

*Primary Examiner*—Ngân V. Ngô
(74) *Attorney, Agent, or Firm*—John F. Vodopia

(57) ABSTRACT

An image pick-up apparatus including an image sensor with a matrix of radiation-sensitive elements, notably a CCD image sensor, is provided with a control circuit for selecting gate electrodes as collecting gate electrodes or as isolating gate electrodes by application of an electric potential of suitable polarity. Groups of collecting gate electrodes are separated from one another by isolating gate electrodes. The surface area of such a group of collecting gate electrodes co-determines the modulation transfer function and hence the spatial resolution of the image sensor; this surface area, and hence the spatial resolution, can be adjusted by adjustment of the electric potentials. Notably the spatial resolution can be rendered dependent on the different modes of operation of the image pick-up apparatus, for example when the image pick-up apparatus forms part of an X-ray examination apparatus which is suitable for fluoroscopy as well as for making X-ray images. Furthermore, the spatial resolution can be adjusted so that it differs in different directions. In the case of an image pick-up apparatus including a plurality of image sensors, each of which picks up the same image, be it with a shift relative to one another, an image is composed from the images supplied by the various image sensors. Differentiation of the spatial resolutions of the images constituting the composite image enables a spatial resolution in the composite image to be achieved which is the same and higher in all directions.

18 Claims, 3 Drawing Sheets

OTHER PUBLICATIONS

Solid–State Imaging with Charge–Coupled Devices by A.J.P. Theuwissen, Klurwer Academic Publishers, 1995, pp. xxv–xxvi, 1–3 and 114–127.

Charge–Injection Imaging: Operating Techniques and Performances Characteristics, H.K. Burke et al., IEEE Journal of Solid–State Circuits, vol. SC–11, No. 1, 1976, pp. 121–128.

A New Organization Area Image Sensor With CCD Readout through Charge Priming Transfer, S. Terakawa et al., IEEE Electron Device Letters, vol. EDL–1, No. 5, 1980, pp. 86–88.

A Solid State Color Video Camera with a Horizontal Readout MOS Imager, M. Noda et al., IEEE Transactions on Consumer Electronics, vol. CE–32, No. 3, 1986, pp. 329–336.

* cited by examiner

IMAGE PICK-UP APPARATUS

This is a continuation of application Ser. No. 08/345,025 filed Nov. 23, 1994, now abandoned.

BACKGROUND OF THE INVENTION

1. Field of the Invention

The invention relates to an image pick-up apparatus, comprising an image sensor with a plurality of gate electrodes which define light-sensitive elements in a semiconductor body which convert incident radiation into collected charge carriers, and also comprising a control circuit for the gate electrodes. The invention also relates to an X-ray examination apparatus comprising such an image pick-up apparatus.

2. Description of the Related Art

An image pick-up apparatus of this kind is known from United States Patent Specification U.S. Pat. No. 4,926,225. The known image pick-up apparatus comprises an image sensor with light-sensitive elements in a semiconductor body which are separated by gate electrodes, thus forming a so-called charge-coupled device (CCD) image sensor. When light radiation is incident on a photosensitive element, electric charges are released at the area of said element by absorption of light quanta and collected as a charge package with an amount of charge which corresponds to the intensity of the incident light radiation. The photosensitive elements together pick up a light image by conversion into a charge carrier image, the brightness value in a pixel of the light image corresponding to the charge in a corresponding light-sensitive element. The prior-art image pick-up apparatus comprises the control circuit in order to adjust the electric voltage applied to the gate electrodes in conformity with a selected mode of operation of the image pick-up apparatus. The region of a light-sensitive element wherefrom charges are collected extends from the charge collection region of the light-sensitive element in the depth direction of the semiconductor body. The depth of the region wherefrom charge is collected can be influenced by adjustment of the gate voltage. In order to reduce crosstalk between neighboring light-sensitive elements, notably for radiation having a comparatively long wavelength such as, for example infrared light, in a prior-art image pick-up apparatus the depth of the regions of the light-sensitive elements wherefrom charge is collected is reduced as the wavelength of the incident radiation is longer, and hence the penetration depth of the incident radiation is greater. The charge released by deeply penetrating radiation which is incident on a light-sensitive element is thus prevented from being collected in a neighboring light-sensitive element where it would cause crosstalk. Consequently, during operation of the known image pick-up apparatus crosstalk is avoided when incident image-carrying radiation of great penetration depth is picked up. The lateral dimensions of the light-sensitive elements of the described image pick-up apparatus, however, cannot be influenced and the spatial resolution of the described image pick-up apparatus cannot be adapted; moreover, it is not possible to increase the spatial resolution, if desired, other than by replacement of the entire image sensor.

SUMMARY OF THE INVENTION

It is inter alia an object of the invention to provide an image pick-up apparatus which comprises an image sensor with a plurality of light-sensitive elements whose spatial resolution can be adjusted.

This object is achieved by means of an image pick-up apparatus according to the invention which is characterized in that the control circuit is arranged to adjust the active surface area of the light collecting surfaces by adjustment of electric voltages to be applied to gate electrodes.

A preferred embodiment of an image pick-up apparatus according to the invention is characterized in that the control circuit is arranged to select a first group of gate electrodes as isolating gate electrodes by adjustment of electric voltages which are to be applied to the gate electrodes of the first group and having a polarity which is the same, relative to electric voltages on gate electrodes which are situated adjacent the gate electrodes of the first group and which do not form part of the first group, as the polarity of the charge carriers collected in the light-sensitive elements.

A further preferred embodiment of an image pick-up apparatus according to the invention is characterized in that the control circuit is arranged to select a second group of gate electrodes as collecting gate electrodes by adjustment of electric voltages to be applied to the gate electrodes of the second group and having a polarity which, relative to electric voltages on gate electrodes which are situated adjacent the gate electrodes of the second group and which do not form part of the second group, opposes the polarity of the charge carriers collected in the light-sensitive elements.

In an image pick-up apparatus according to the invention an image is picked up by converting a light image into a charge carrier image by means of the image sensor. The image pick-up apparatus is sensitive to electromagnetic radiation in a range covering ultraviolet radiation, visible light and infrared radiation. The image picked up is read-out from the image sensor so as to be converted into an electronic image signal which is suitable for supply to a monitor or to a buffer circuit while awaiting further image processing. In the image sensor light-sensitive elements are formed by applying an electric voltage to collecting gate electrodes with respect to isolating gate electrodes, which electric voltage has a polarity which opposes the polarity of the charge of the charge carriers to be collected. The collecting gate electrodes of a light-sensitive element are isolated in one or more directions by isolating gate electrodes whereto an electric voltage is applied, relative to the collecting gate electrodes, which is neutral or which has the polarity of the charge carriers to be collected. In another direction light-sensitive elements can be isolated from one another by isolating barriers which impede the diffusion of charge carriers in said other direction. Due to incident radiation charge carriers are released and collected in a region in the semiconductor body which extends mainly below the collecting gate electrodes and below the side of the isolator layer in the semiconductor, facing the semiconductor, in the depth direction of the light-sensitive elements. In as far as charge carriers are released by light incident at the area of an isolating gate electrode, the charge carriers are depleted partly to a substrate of the semiconductor body and are partly collected below adjacent collecting gate electrodes. A group of adjoining collecting gate electrodes defines a light-sensitive element and the active surface area of the light collection surface thereof is determined by the combined surface area of the adjoining gate electrodes. Several groups of adjoining gate electrodes can be formed and such groups define pixels of the charge carrier image to be formed by the image sensor. The spatial resolution is co-determined by the size of the pixels. By adjustment of electric voltages on gate electrodes, i.e. the gate voltages, the gate electrodes are adjusted so as to form collecting gate electrodes or isolating gate electrodes, the active surface area of respective light-sensitive elements thus being adjusted so that adjustability of the spatial resolution is achieved. The adjustability of the spatial resolution of the image sensor can be rendered dependent on a selected mode of operation of the image pick-up apparatus according to the invention, i.e. by connecting the control circuit to a control unit of the image pick-up apparatus. The control unit is arranged to select a mode of operation of the image pick-up apparatus.

A further preferred embodiment of an image pick-up apparatus according to the invention, in which the light-sensitive elements are arranged in rows and columns which constitute a matrix, is characterized in that the number of isolating gate electrodes between adjacent elements of a column of the matrix deviates from the number of isolating gate electrodes between adjacent elements of a row of the matrix.

In such an embodiment of an image pick-up apparatus the spatial resolution in the direction of the matrix rows deviates from the spatial resolution in the direction of the matrix columns. Consequently, in one direction the spatial resolution is higher than that in another direction. From German Offenlegungsschrift DE 33 15 882 it is known per se to increase the spatial resolution in a first direction by utilizing a plurality of image sensors in a image pick-up apparatus which all pick up the same image of a scene, be it with a shift of the scene relative to one another. The shift preferably amounts to a fraction of the distance between pixels of an image sensor. From the electronic image signals of the various image sensors an electronic image signal of a composite image is formed. Due to the mutual shift, in the composite image the spatial resolution is increased in a first direction relative to the scene. An image pick-up apparatus according to the invention ensures that in a direction relative to the scene other than that of the mutual shift of the image sensors the spatial resolution is increased in that the spatial resolution of the various image sensors in said other direction is increased. Thus, using an image pick-up apparatus according to the invention it is achieved that the spatial resolution in the composite image is substantially the same in various directions relative to the scene and higher than can be achieved by means of an image pick-up apparatus comprising a single image sensor.

In a related embodiment of an image pick-up apparatus, the image sensor comprises isolating barriers which isolate the columns of the matrix from one another. The isolating barriers impede diffusion of charge carriers, released by incident radiation in light-sensitive elements, from one column to an adjoining column. Within a column light-sensitive elements are isolated from one another by isolating gate electrodes. By selecting gate electrodes as isolating gate electrodes within a column, the dimensions of surface areas of light-sensitive elements along the columns are adjusted. It is thus achieved that the dimension of the active surface areas of the light-sensitive elements in the direction of the rows of the matrix is determined by the spacing of the isolating barriers and is adjustable in the direction along the columns of the matrix by adjustment of the gate voltages. It is achieved notably that an adjustable difference exists between the dimensions of said active surface areas along the rows and the dimensions along the columns.

A further preferred embodiment of an image pick-up apparatus according to the invention is characterized in that the control circuit is arranged to adjust the value of the electric voltages.

The active surface area of the light-sensitive elements is influenced not only by the polarity of the electric voltages applied to the isolating gate electrodes, but also by the magnitude of these electric voltages. When the collected charge carriers are electrons and hence the isolating gate electrodes receive negative electric voltages relative to the collecting gate electrodes, as the electric voltage applied to the isolating gate electrodes is more negative, the modulation transfer function of the image sensor will be increased substantially further relative to the increase of the modulation transfer function which corresponds to the increase of the spatial resolution by the selection of gate electrodes as isolating gate electrodes by adjustment of electric voltages relative to the collecting gate electrodes with a polarity which is the same as the polarity of the charge carriers for application to selected gate electrodes.

A further preferred embodiment of an image pick-up apparatus according to the invention is characterized in that the control circuit is arranged to adjust the value of the electric voltages to one value during the formation of an electron image in the image sensor, and to a different value thereafter.

The spatial resolution of the charge carrier image is determined by selection of electric gate voltages and magnitudes thereof during the image pick-up phase in which the light-sensitive elements convert a light image into a charge carrier image. During a next phase, the charge carrier image is read-out by periodically shifting the electric voltage pattern applied to the gate electrodes in the direction of a read-out circuit. Consequently, the pattern of isolating gate electrodes is also periodically shifted, because electric voltages of a polarity relative to collecting gate electrodes which is the same as that of the charge carriers are applied to successive groups of gate electrodes, so that the charge packages are transferred each time to adjacent elements and ultimately to the read-out circuit. The increased spatial resolution is maintained when an electric voltage of a magnitude smaller than that during the image pick-up phase, or even a neutral electric voltage, is applied to isolating gate electrodes during the read-out phase. By utilizing lower electric voltages during the read-out phase, the electric power dissipation of the image sensor is limited.

An image pick-up apparatus comprising a beam splitter for splitting a light-image-carrying beam into at least two light-image-carrying sub-beams, and also comprising at least two image sensors, each of which comprises a plurality of gate electrodes which define light-sensitive elements in a semiconductor body which convert incident light-image-carrying sub-beams into collected charge carriers, and a control circuit for the gate electrodes, and also combination means for combining electronic image signals from respective image sensors so as to form an electronic image signal of a composite image, preferably comprises the control circuit which is arranged to adjust active surfaces of light-collecting surfaces of the light-sensitive elements by adjustment of electric voltages to be applied to the gate electrodes. Increasing the spatial resolution in one direction, for example the row direction, is advantageous notably in an image pick-up apparatus in which two or more CCD sensors are used, each of which picks up the same image, be it with a shift amounting to a fraction of the distance between adjacent rows relative to one another. In the case where two CCD sensors are used, the fraction preferably amounts to one half of the distance between adjacent rows. From the electronic image signals of said two image sensors an electronic image signal is composed in that image lines of the electronic image signal of one CCD sensor constitute the odd image lines in the composite image and the image lines of the other CCD sensor constitute the even image lines in the composite image. By adjustment of the electric gate voltages it is achieved that the spatial resolution in the composite image becomes substantially equal in both directions.

By irradiation of an object or a patient to be examined by means of X-rays an X-ray examination apparatus forms an X-ray image on an entrance window of an X-ray image intensifier which converts the X-ray image into a light image on an exit screen of the X-ray image intensifier. The light emitted by the exit screen is picked up by an image pick-up apparatus according to the invention which converts the light image into an electric image signal which is suitable for supply to a monitor or for electronic processing in another manner. When used in an X-ray examination apparatus, an image pick-up apparatus according to the invention notably offers the advantage that the spatial resolution of the image pick-up apparatus can be adjusted in conformity with the mode of operation of the X-ray examination apparatus, for example fluoroscopy or X-ray imaging. Notably when X-ray images are formed by means of an X-ray examination apparatus comprising an image pick-up apparatus according to the invention, utilizing a comparatively high X-ray dose, it is achieved that the image quality of the image picked up is increased because the spatial resolution is increased, so that smaller details can be distinguished in the image picked up. In an image pick-up apparatus which forms part of an X-ray examination apparatus the control unit is connected to an adjusting unit of the X-ray apparatus. The adjusting unit adjusts the X-ray apparatus, inter alia by adjustment of an X-ray source in respect of energy, dose and pulse duration of the X-rays applied. In dependence on the adjustment of the X-ray source, a signal is applied to the control unit so as to select a mode of operation of the image pick-up apparatus, and notably to adjust the spatial resolution of the image sensor included in the image pick-up apparatus, utilizing the control circuit, in conformity with the adjustment of the X-ray apparatus.

BRIEF DESCRIPTION OF THE DRAWING

The invention will be described in detail hereinafter, by way of example, on the basis of some embodiments and with reference to the accompanying drawings; therein.

DETAILED DESCRIPTION OF THE PREFERRED EMBODIMENTS

Figure 1:
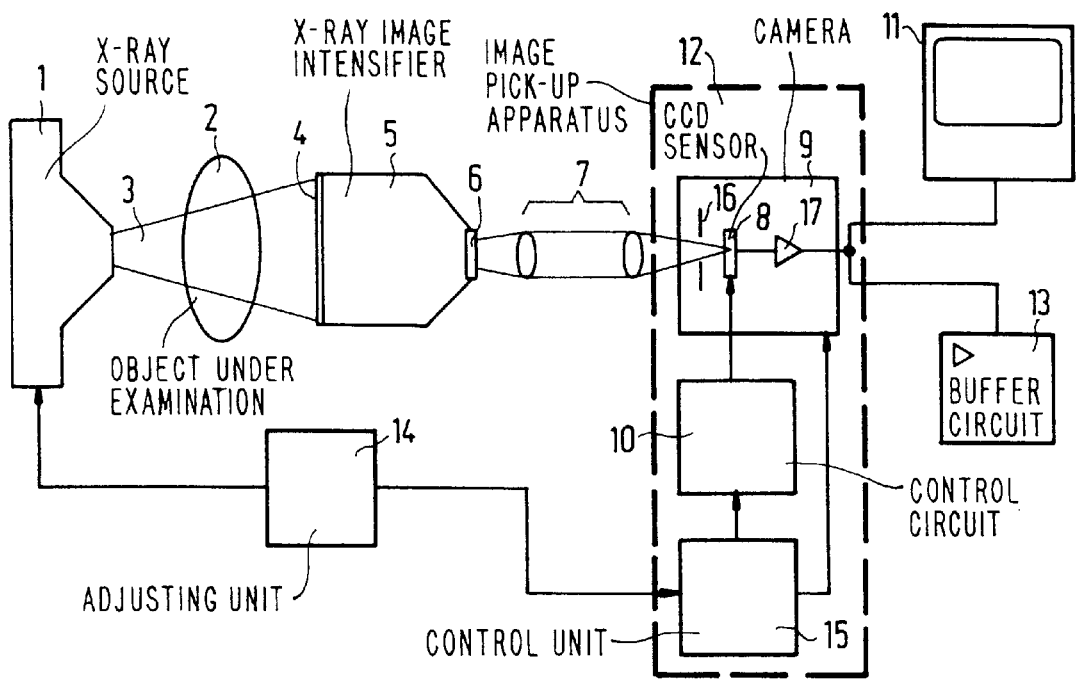
FIG. 1 shows diagrammatically an X-ray examination apparatus with an image pick-up apparatus according to the invention.

FIG. 1 shows diagrammatically an X-ray examination apparatus which comprises an image pick-up apparatus according to the invention. An X-ray source 1 irradiates an object 2, notably a patient to be examined, by means of an X-ray beam 3 and an X-ray image is picked up by an entrance screen 4 of an X-ray image intensifier which converts the X-ray image into a light image on the exit window 6. Via a lens system 7, the light image is imaged on an image sensor 8 in the form of a charge-coupled (CCD) sensor 8 which forms part of a camera 9 which forms an electronic image signal from the light image. A control circuit 10 is arranged to adapt the adjustments of the electric gate voltages of the CCD sensor to the selected mode of operation, for example X-ray imaging or fluoroscopy. The camera 9 and the control circuit 10 constitute an image pick-up apparatus 12. The electronic image signal is applied to a monitor 11 so as to be observed, for example by a radiologist, or is applied to a buffer circuit 13 to await further processing. The X-ray examination apparatus also comprises an adjusting unit 14 for adjusting the X-ray examination apparatus, notably the X-ray source 1 in respect of energy, dose and pulse duration of the X-rays emitted by the X-ray source. The adjusting unit 14 is coupled to a control unit 15 of the image pick-up apparatus. The adjusting unit 14 supplies the X-ray source 1 and the control unit 15 with an adjustment signal. The control unit selects a mode of operation of the image pick-up apparatus in conformity with the adjustment of the X-ray source. Selection of such a mode of operation implies the supply of a selection signal to the control circuit 10 for adjustment of a selection signal for supply to a gate circuit in order to adjust the gate voltages so as to obtain a desired spatial resolution, but also for the adjustment of a diaphragm 16 or for the adjustment of an electronic amplifier unit 17 for amplifying the electronic image signal.

Figure 2:
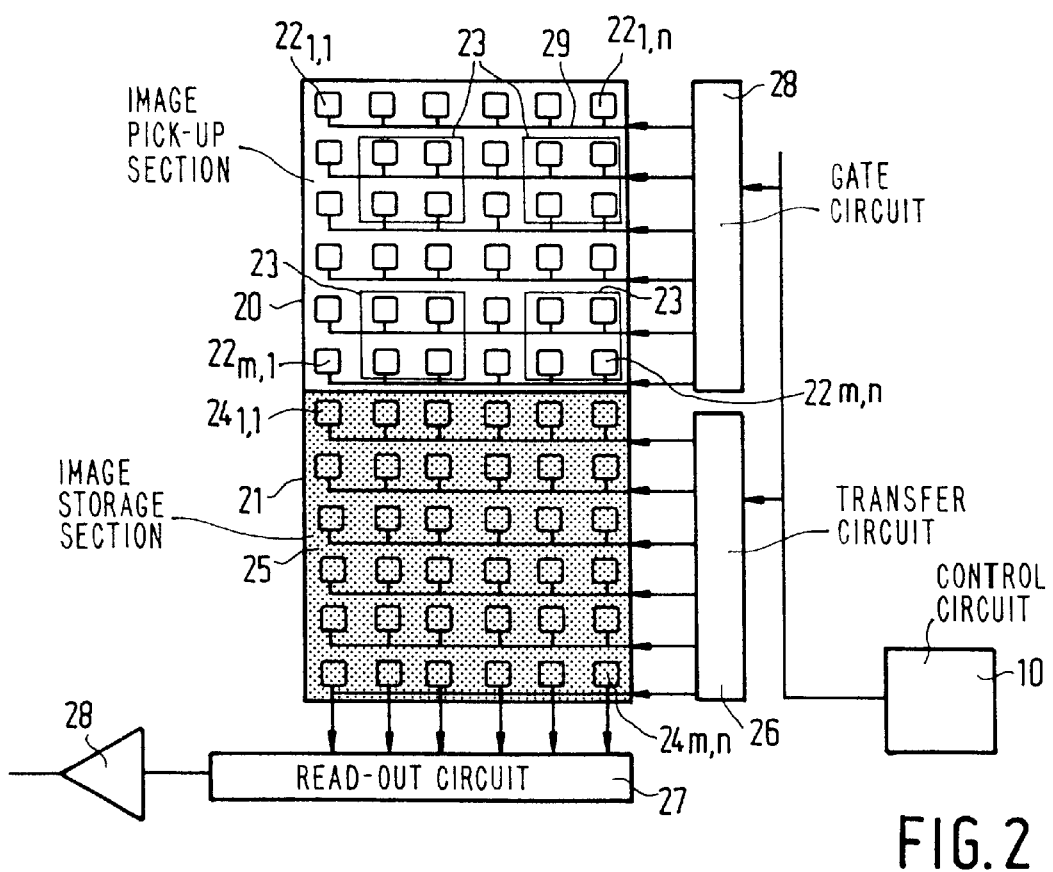
FIG. 2 is a diagrammatic front view of a charge-coupled image sensor of the image pick-up apparatus shown in FIG. 1, FIGS. 3a, 3b and 3c offer a diagrammatic impression of respective lateral dimensions of a light-sensitive element for different electric voltages applied to the charge-coupled image sensor of the image pick-up apparatus of FIG. 1, FIG. 3d offers a diagrammatic impression of lateral dimensions of a light-sensitive element of an image sensor provided with isolating barriers between the columns of light-sensitive elements.

FIG. 2 is a diagrammatic front view of a CCD sensor of the image pick-up apparatus shown in FIG. 1. The CCD sensor comprises an image pick-up section 20 and a storage section 21. The image pick-up section 20 comprises a plurality of gate electrodes $22_{1,1}$–$22_{n,m}$ which are arranged in a matrix. A gate circuit 28 applies electric voltages to the gate electrodes of the image pick-up section 20. The gate electrodes are arranged on an isolator layer which is composed, for example of silicon oxide, or of silicon nitride, or of a combination of silicon dioxide and silicon nitride. The isolator layer is provided on a crystalline silicon substrate. The electric voltages applied to the various gate electrodes co-determine the potential variation in the depth direction of the substrate. Regions in the substrate which are situated underneath gate electrodes carrying a positive electric voltage constitute light-sensitive elements. When an image-carrying light beam which is emitted, for example by the exit window 6 of the X-ray image intensifier, is incident on the image pick-up section of the CCD sensor, charge carriers are released in the light-sensitive elements, which charge carriers are collected underneath the collecting gate electrodes and the isolator layer and the substrate. These charge carriers may be electrons, but also holes. For the description of the figures of the drawings, it is assumed, by way of example, that the charge carriers collected are electrons. Gate electrodes carrying a positive electric voltage operate as collecting gate electrodes which collect electrons released by radiation absorption. Gate electrodes carrying a negative electric voltage isolate light-sensitive elements from one another, so that they act as isolating gate electrodes. The charges collected in the light-sensitive elements correspond to the light intensities incident on the light-sensitive elements; a light image is thus converted into an electron image in the image pick-up section of the CCD sensor. The gate circuit 28 supplies groups 23 of gate electrodes, electrically connected to the gate circuit via contact lines 29, with an electric voltage which is positive relative to the gate electrodes adjoining said groups, the groups 23 being isolated from one another by gate electrodes which receive a negative electric voltage via the gate circuit. The light-sensitive elements are thus formed by metal oxide semiconductor (MOS) capacitances operating in deep depletion, and the light-sensitive elements are isolated by MOS capacitances connected in the reverse direction. After formation of the charge carrier image, being an electron image when electrons are collected by the collecting gate electrodes, the gate circuit repeatedly shifts the pattern of applied electric voltages through one matrix row in the direction of the storage section 21 so as to transfer the electron image from the image pick-up section to the storage section. To this end, the image sensor also comprises a storage section having a matrix of gate electrodes $24_{1,1}$–$24_{n,m}$ on an isolator layer which is composed of, for example silicon dioxide provided on a silicon substrate. The image pick-up section is shielded from light incident on the CCD sensor by way of a light-impermeable shield 25. The gate electrodes $24_{k,1}$ of the storage section receive electric voltages via a transfer circuit 26 which electrically connects the gate electrodes 24 to the transfer circuit via contact lines 29.

A read-out circuit 27 is formed as a horizontal read-out register and is connected to the columns of gate electrodes of the storage section 21. In order to read-out an electron image stored in the storage section, the transfer circuit transfers the charges constituting the picked up electron image to the read-out circuit 27 by repeatedly shifting the pattern of the electric voltages applied to the gate electrodes $24_{k,1}$ of the storage section 21 in the direction of the read-out circuit 27. From the read-out circuit 27 the charges of successively read-out matrix rows are applied to an amplifier which converts the charges into electric voltage pulses which constitute an electronic video signal.

Figure 3A:
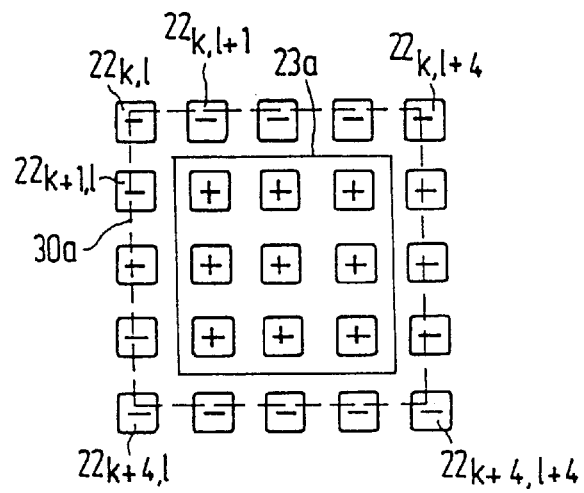
Figure 3B:
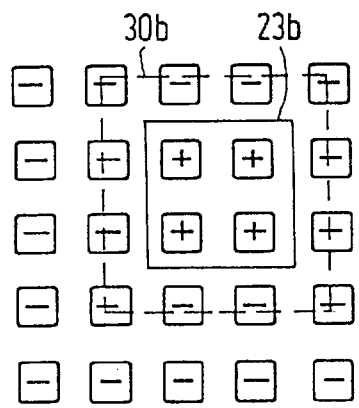
Figure 3C:
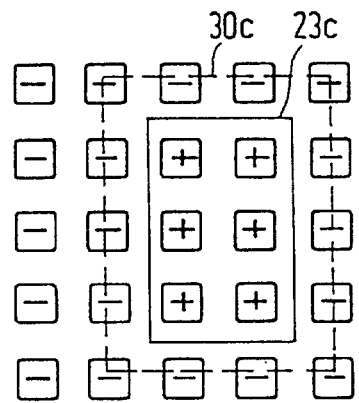

FIGS. 3a, 3b and 3c offer a diagrammatic impression of respective lateral dimensions, i.e. dimensions in the face of the image sensor which faces the light beam incident on the image sensor, of a light-sensitive element for different electric gate voltages applied to the CCD sensor of the image pick-up apparatus of FIG. 1. The electric voltages applied to the gate electrodes are controlled by the control circuit. The control circuit 10 applies a selection signal to the gate circuit 28 and to the transfer circuit 26 in order to select an electric voltage pattern in conformity with a selected mode of operation of the X-ray examination apparatus or the image pick-up apparatus 12. The spatial resolution of the CCD sensor is determined by the lateral dimensions of the groups of gate electrodes 23 whereto positive electric voltages are applied during the picking up of an image. FIG. 3a shows a 5×5 part of the gate electrodes of the image pick-up section. As is shown in FIG. 3a, a group 23a of 3×3 gate electrodes $23_{k+1,1+1}$–$23_{k+3,1+3}$ receives an electric voltage which is positive relative to the gate electrodes surrounding the group 23a, the group 23a being surrounded by gate electrodes which receive a negative electric voltage relative to the group 23a. The electric voltage pattern for the entire image pick-up section consists of a periodic continuation in the row and column directions of the spatial resolution of the CCD sensor; thus, the smallest detail in the light image that can still be distinguished in the electron image derived therefrom is now determined by the lateral dimensions of the surface of the region 30a as determined by the group 23a. The enclosure of the group 23b by gate electrodes carrying a negative electric voltage consists of regions having a width of one gate electrode in the row direction as well as in the column direction. Image details in the light image, imaged on the image sensor by means of the lens system 7, of dimensions smaller than the dimensions of the region 30b cannot be distinguished from one another in the electron image formed when the applied electric voltages are adjusted in this manner. Using the control circuit 10, an alternative electric voltage pattern can be applied to the gate electrodes of the image pick-up section 20 by application of a selection signal during the picking up of an image.

An example of a first alternative electric voltage pattern is shown in FIG. 3b in which a group 23b of 2×2 gate electrodes receives a positive electric voltage, said group being enclosed by gate electrodes carrying a negative electric voltage. The enclosure of the group 23b by gate electrodes carrying a negative electric voltage consists of regions having a width of two gate electrodes in the row direction as well as the column direction. The region 30b underneath which electrons are collected after absorption of light has a light collecting surface area whose dimensions are smaller than those of the corresponding region 30a in FIG. 3a. As a result, the modulation transfer function of the image sensor is increased for the electric voltage pattern of FIG. 3b, so that smaller details can be distinguished in the electron image and the spatial resolution of the image pick-up apparatus is enhanced by using the electric voltage pattern shown in FIG. 3b.

FIG. 3c shows an example of a second alternative electric voltage pattern; a group 23c of 2×3 gate electrodes then receives a positive electric voltage, said group being enclosed by gate electrodes carrying a negative electric voltage relative to the group 23c. In the column direction the enclosure of the group 23c consists of regions of a width of one gate electrode, whereas in the row direction it consists of regions of a width of two gate electrodes. The region 30c underneath which electrons are collected has a light collecting surface whose dimension in the row direction is smaller than that of the corresponding region 23a in FIG. 3a. As a result, the modulation transfer function is increased, and hence also the spatial resolution of the image pick-up apparatus in the row direction of the CCD sensor, whereas the spatial resolution remains the same in the column direction. Increasing the spatial resolution in one direction, for example the row direction, is advantageous in an image pick-up apparatus in which two or more CCD sensors are used, each of which picks up the same image, be it with a shift amounting to a fraction of the distance between adjacent rows relative to one another. In the case where use is made of two CCD sensors, said fraction preferably amounts to half the distance between adjacent rows. From the electronic image signals of the two image sensors there is formed one electronic image signal in that image lines of the electronic image signal of one CCD sensor constitute the odd image lines in the composite image and the image lines of the other CCD sensor constitute the even image lines in the composite image. By adjusting the electric gate voltages in conformity with FIG. 3c it is achieved that the spatial resolution becomes substantially equal in both directions in the composite image.

Figure 3D:
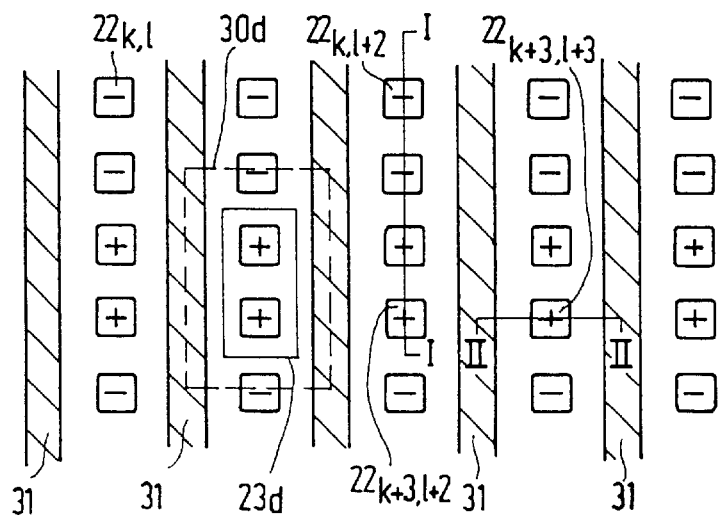

FIG. 3d is a plan view of an alternative embodiment of an image sensor of an image pick-up apparatus according to the invention; this figure offers a diagrammatic impression of lateral dimensions of a light-sensitive element of an image sensor provided with isolating barriers between the columns of light-sensitive elements. A group of collecting gate electrodes 23d is formed by gate electrodes which have been selected as collecting gate electrodes. The region 30*d* defines the active surface area of a light-sensitive element. The gate electrodes 22$_{k+1,1+2}$ and 22$_{k+1,1+3}$ have been selected as collecting gate electrodes by applying an electric voltage thereto which is positive relative to adjoining gate electrodes 22$_{k+1,1}$ and 22$_{k+1,1+4}$. The columns of light-sensitive elements are isolated from one another by isolating barriers 31.

Figure 4A:
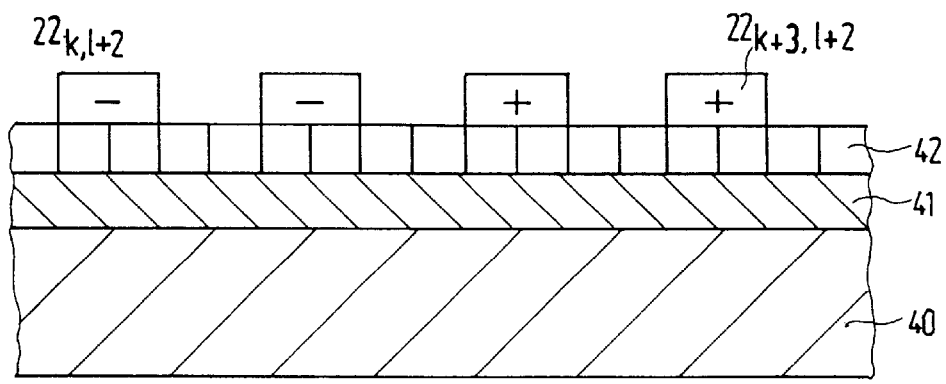
FIG. 4a is a sectional view, taken along the line I—I, of the image sensor shown in FIG. 3d.

FIG. 4*a* is a sectional view, taken along the line I—I, of the image sensor shown in FIG. 3*d*. The image sensor is described, by way of example, as an image sensor in which the collected charge carriers are electrons. To this end, an n-type crystalline silicon layer which acts as a charge channel 41 is provided on a p-type crystalline silicon substrate 40. On the charge channel 41 there is provided an isolator layer 42 of, for example silicon dioxide and on the isolator layer there are provided the gate electrodes which are made of polycrystalline silicon and which are rendered adequately conductive by doping. The contact lines 29 are also made of such polycrystalline silicon. It is thus achieved that gate electrodes are electrically connected to the gate circuit 28 by conductors which are also transparent to the incident radiation. Light incident on the image sensor releases electron-hole pairs in the n-type charge channel; the holes are drained to the p-type substrate and the electrons are collected in the charge channel 41, notably underneath the collecting gate electrodes.

Figure 4B:
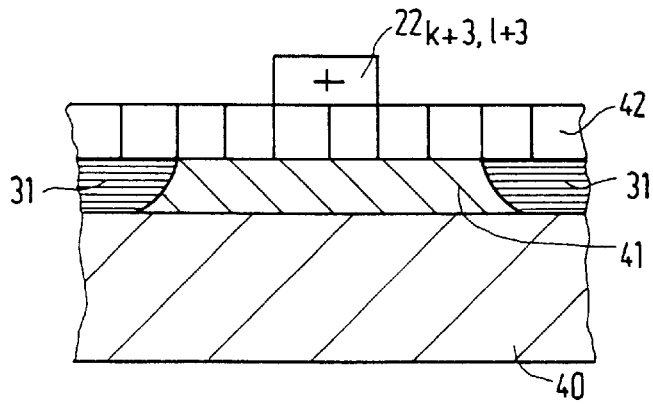
FIG. 4b is a sectional view, taken along the line II—II, of the image sensor shown in FIG. 3d.

FIG. 4*b* is a sectional view, taken along the line II—II, of the image sensor shown in FIG. 3*d*. FIG. 4*b* shows notably that the charge channel 41 is bounded on both sides by isolating barriers 31 made of p-type silicon. Migration of electrons to adjacent columns is impeded by the isolating barriers 31 because a p-n-junction in the reverse direction is formed at the interface between the charge channel 41 and the isolating barriers 31.

Instead of being made of p-type silicon, the substrate may also be made of n-type silicon which is isolated from the charge channel 41 by a p-type silicon intermediate layer. This version of an image sensor according to the invention also offers the advantage that deeply penetrating radiation, for example infrared radiation, releases charge carriers in the n-type substrate which cannot reach the charge channel because the intermediate layer constitutes a barrier. When in the event of high incident light intensities such large quantities of charge are collected underneath the collecting gate electrodes that diffusion to an adjacent light-sensitive element could occur, diffusion is avoided in that superfluous charge is drained, through the intermediate layer, to the n-type silicon substrate instead of to an adjacent light-sensitive element.

Figure 5:
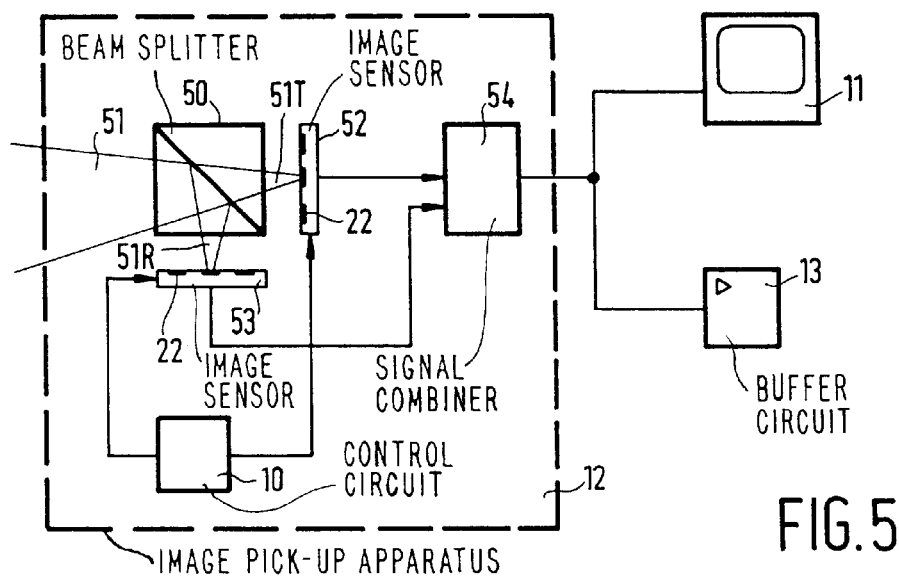
FIG. 5 shows diagrammatically an image pick-up apparatus comprising a beam splitter.

FIG. 5 shows diagrammatically an image pick-up apparatus 12, comprising a beam splitter 50 for splitting a light-image-carrying beam into an image-carrying reflected sub-beam 51R and an image-carrying transmitted sub-beam 51T. These image-carrying sub-beams are projected onto separate image sensors 52 and 53, each of which comprises a plurality of gate electrodes 22. The image sensors convert the image-carrying sub-beams into collected charge carriers which from electronic sub-images in the image sensors and which are converted into electronic sub-image signals which are applied to signal combiner 54 in which the electronic sub-image signals are combined to form an electronic image signal of a composite image. The image sensors 52 and 53 are, for example CCD sensors, each of which picks up the same image, be it with a shift of a fraction, for example half, of the distances between adjacent rows of gate electrodes in one direction. From the electronic sub-image signals of the two image sensors an electronic image signal is composed in that image lines of the electronic image signal of one image sensor constitute the odd image lines in the composite image and the image lines of that of the other image sensor constitute the even image lines in the composite image. Such combination enhances a spatial resolution in a direction transversely of the direction of the image lines. The control circuit 10 is coupled to the image sensors 52 and 53 in order to adjust the electric gate voltages on the gate electrodes 22 in such a manner that the spatial resolution in the composite image is substantially the same in directions parallel to and transversely of the image lines.

What is claimed is:

1. An image pick-up apparatus, comprising an image sensor with a plurality of gate electrodes arranged over a semiconductor body and, in dependence on voltages applied to the gate electrodes, defining lateral dimensions of regions in the semiconductor body which constitute respective light-sensitive elements, each light-sensitive element being underneath one or more adjoining gate electrodes and having an active surface area, which light-sensitive element converts radiation incident on its active surface area into collected charge carriers, and a control circuit which is configured to adjust the size of the active surface areas of the light-sensitive elements by adjustment of electric voltages to be applied to the gate electrodes.

2. An image pick-up apparatus as claimed in claim 1, wherein the control circuit is configured to select a first group of gate electrodes as isolating gate electrodes isolating said regions constituting said light-sensitive elements from each other, by adjustment of electric voltages to be applied to the gate electrodes of the first group and having a polarity which is the same, relative to electric voltages on gate electrodes which are situated adjacent the gate electrodes of the first group and which lie in said regions and do not form part of the first group, as the polarity of the charge carriers collected in the light-sensitive elements.

3. An image pick-up apparatus as claimed in claim 1, wherein the control circuit is configured to select a group of gate electrodes as collecting gate electrodes which lie in said regions constituting said light-sensitive elements by adjustment of electric voltages to be applied to the gate electrodes of said group and having a polarity which, relative to electric voltages on gate electrodes which are situated adjacent the gate electrodes of said group and which do not form part of said group, opposes the polarity of the charge carriers collected in the light-sensitive elements.

4. An image pick-up apparatus as claimed in claim 1, wherein the light-sensitive elements are arranged in rows and columns which constitute a matrix, are isolated from each other by gate electrodes having a voltage applied which selects them to be isolating gate electrodes, and a number of isolating gate electrodes between adjacent light-sensitive elements of a column of the matrix deviates from a number of isolating gate electrodes between adjacent elements of a row of the matrix.

5. An image pick-up apparatus as claimed in claim 2, wherein the control circuit is configured to adjust the value of the electric voltages.

6. An image pick-up apparatus as claimed in claim 5, wherein the control circuit is configured to adjust the value of the electric voltages to one value during the formation of an electron image in the image sensor, and to a different value thereafter.

7. An image pick-up apparatus comprising a beam splitter for splitting a light-image-carrying beam into at least two light-image-carrying sub-beams, and also comprising at least two image sensors upon which the at least two light carrying sub-beams are incident, respectively, each of which comprises a plurality of gate electrodes arranged over a semiconductor body and, in dependence on voltages applied to the gate electrodes, defining lateral dimensions of regions in the semiconductor body which constitute respective light-sensitive elements, each light-sensitive element being underneath one or more adjoining gate electrodes and having an active surface area, which light-sensitive element converts radiation incident on its active surface area into collected charge carriers, and a control circuit for the gate electrodes, and also combination means for combining electronic image signals from the respective image sensors so as to form an electronic image signal of a composite image, wherein the control circuit is configured to adjust the size of the active surface areas of the light-collecting surfaces of the light-sensitive elements by adjustment of electric voltages to be applied to the gate electrodes.

8. An X-ray examination apparatus comprising an X-ray source for forming an X-ray image-carrying beam exiting an object under examination, means for converting the X-ray image carrying beam into a light-image-carrying beam, and an image pick-up apparatus for detecting the light-image carrying beam, said image pick-up apparatus comprising an image sensor with a plurality of gate electrodes arranged over a semiconductor body and, in dependence on voltages applied to the gate electrodes, defining lateral dimensions of regions in the semiconductor body which constitute respective light-sensitive elements, each light-sensitive element being underneath one or more adjoining gate electrodes and having an active surface area, which light-sensitive element converts radiation incident on its active surface area into collected charge carriers, and also comprising a control circuit which is configured to adjust the size of the active surface areas of the light-sensitive elements by adjustment of electric voltages to be applied to the gate electrodes.

9. An image pick-up apparatus as claimed in claim 2, wherein the control circuit is also configured to select a second group of gate electrodes as collecting gate electrodes by adjustment of electric voltages to be applied to the gate electrodes of the second group and having a polarity which, relative to electric voltages on gate electrodes which are situated adjacent the gate electrodes of the second group and which do not form part of the second group, opposes the polarity of the charge carriers collected in the light-sensitive elements.

10. An image pick-up apparatus as claimed in claim 2, wherein the light-sensitive elements are arranged in rows and columns which constitute a matrix, are isolated from each other by gate electrodes having a voltage applied which selects them to be isolating gate electrodes, and a number of isolating gate electrodes between adjacent light-sensitive elements of a column of the matrix deviates from a number of isolating gate electrodes between adjacent elements of a row of the matrix.

11. An image pick-up apparatus as claimed in claim 3, wherein the light-sensitive elements are arranged in rows and columns which constitute a matrix, are isolated from each other by gate electrodes having a voltage applied which selects them to be isolating gate electrodes, and a number of isolating gate electrodes between adjacent light-sensitive elements of a column of the matrix deviates from a number of isolating gate electrodes between adjacent elements of a row of the matrix.

12. An image pick-up apparatus as claimed in claim 9, wherein the light-sensitive elements are arranged in rows and columns which constitute a matrix, are isolated from each other by gate electrodes having a voltage applied which selects them to be isolating gate electrodes, and a number of isolating gate electrodes between adjacent light-sensitive elements of a column of the matrix deviates from a number of isolating gate electrodes between adjacent elements of a row of the matrix.

13. An image pick-up apparatus as claimed in claim 3, wherein the control circuit is arranged to adjust the value of the electric voltages.

14. An image pick-up apparatus as claimed in claim 4, wherein the control circuit is configured to adjust the value of the electric voltages.

15. An image pick-up apparatus as claimed in claim 12, wherein the control circuit is configured to adjust the value of the electric voltages.

16. An image pick-up apparatus as claimed in claim 13, wherein the control circuit is configured to adjust the value of the electric voltages to one value during the formation of an electron image in the image sensor, and to a different value thereafter.

17. An image pick-up apparatus as claimed in claim 14, wherein the control circuit is configured to adjust the value of the electric voltages to one value during the formation of an electron image in the image sensor, and to a different value thereafter.

18. An image pick-up apparatus as claimed in claim 15, wherein the control circuit is configured to adjust the value of the electric voltages to one value during the formation of an electron image in the image sensor, and to a different value thereafter.

* * * * *